United States Patent
Heiper et al.

(10) Patent No.: US 8,850,270 B2
(45) Date of Patent: Sep. 30, 2014

(54) TEST SELECTION

(75) Inventors: Andre Heiper, Haifa (IL); Aharon Kupershtok, Ramat Gan (IL); Yaakov Yaari, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 13/552,665

(22) Filed: Jul. 19, 2012

(65) Prior Publication Data
US 2014/0025997 A1 Jan. 23, 2014

(51) Int. Cl.
*G06F 11/00* (2006.01)

(52) U.S. Cl.
USPC ............................................. 714/38.1; 714/37

(58) Field of Classification Search
CPC ....................................................... G06F 11/366
USPC ............................. 714/38.1, 37; 717/124, 126
See application file for complete search history.

(56) References Cited

U.S. PATENT DOCUMENTS

| | | | |
|---|---|---|---|
| 6,766,473 B2 | 7/2004 | Nozuyama | |
| 7,363,202 B2 * | 4/2008 | Campbell et al. | 703/2 |
| 7,363,616 B2 * | 4/2008 | Kalyanaraman | 717/124 |
| 7,587,708 B2 | 9/2009 | King | |
| 7,904,270 B2 | 3/2011 | Bohizic et al. | |
| 8,621,434 B2 * | 12/2013 | Campion et al. | 717/124 |
| 2006/0095312 A1 * | 5/2006 | Conti et al. | 705/10 |
| 2006/0129994 A1 | 6/2006 | Srivastava et al. | |
| 2010/0180258 A1 | 7/2010 | Takahashi | |
| 2011/0289488 A1 | 11/2011 | Ghosh | |

OTHER PUBLICATIONS

William E. Howden, "Confidence-Based Reliability and Statistical Coverage Estimation", Proceedings of the 8th International Symposium on Software Reliability Engineering (ISSRE'97), 1997.
Shen et al., "Designing an Effective Constraint Solver in Coverage Directed Test Generation", ICESS '09: Proceedings of the 2009 International Conference on Embedded Software and Systems, May 2009.
Scott McMaster, "Call-Stack Coverage for GUI Test Suite Reduction", IEEE Transactions on Software Engineering, vol. 34, No. 1, pp. 99-115, Jan./Feb. 2008.
Jones and Harrold, "Test-Suite Reduction and Prioritization for Modified Condition/Decision Coverage", Proceedings. IEEE International Conference on Software Maintenance, pp. 92-101, 2001.
Sheel Jain and Gupta, "Refinement of the Test Bed Using Various Prioritization Techniques for Assuring Software-Quality", Computational Intelligence and Information Technology—Communications in Computer and Information Science, vol. 250, Part 2, pp. 657-661, 2011.
Pacheco et al., "Feedback-Directed Random Test Generation", 29th International Conference on Software Engineering, 2007.

* cited by examiner

*Primary Examiner* — Dieu-Minh Le
(74) *Attorney, Agent, or Firm* — Riv Goldberg

(57) ABSTRACT

Computer-implemented method, computerized apparatus and a computer program product for test selection. The computer-implemented method comprising: obtaining a test suite comprising a plurality of tests for a Software Under Test (SUT); and selecting a subset of the test suite, wherein the subset provides coverage of the SUT that correlates to a coverage by a workload of the SUT, wherein the workload defines a set of input events to the SUT thereby defining portions of the SUT that are to be invoked during execution.

18 Claims, 4 Drawing Sheets

TEST SELECTION

TECHNICAL FIELD

The present disclosure relates to testing in general, and to selection of a subset of tests to be used in testing, in particular.

BACKGROUND

Software testing is an investigation conducted to check functionality of a Software Under Test (SUT). Test techniques include, but are not limited to, the process of executing a program or application with the intent of finding software bugs (errors or other defects).

There may be limited resources to running the tests, such as for example, processors that can be used, memory allocated for testing, time allotted to performing the tests, or the like. Some testing techniques attempt to optimize a test suite before executing it, such as by developing specific tests that are designed to test a particular aspect of the SUT.

One other manner of test planning is concerned with selection of subset of tests from a given test base. The subset is selected to provide for the same coverage as the test base but with a smaller number of tests. If such a subset is desired, it may be decided that some tests (i.e., tests not in the subset) will not be performed without reducing the coverage achieved in the testing phase.

BRIEF SUMMARY

One exemplary embodiment of the disclosed subject matter is a computer-implemented method, the method performed by a processor, the method comprising: obtaining a test suite comprising a plurality of tests for a Software Under Test (SUT); and selecting a subset of the test suite, wherein the subset provides coverage of the SUT that correlates to a coverage by a workload of the SUT, wherein the workload defines a set of input events to the SUT thereby defining portions of the SUT that are to be invoked during execution.

Another exemplary embodiment of the disclosed subject matter is a computerized apparatus having a processor and a memory, the processor being adapted to perform the steps of: obtaining a test suite comprising a plurality of tests for a Software Under Test (SUT); and selecting a subset of the test suite, wherein the subset provides coverage of the SUT that correlates to a coverage by a workload of the SUT, wherein the workload defines a set of input events to the SUT thereby defining portions of the SUT that are to be invoked during execution.

Yet another exemplary embodiment of the disclosed subject matter is a computer program product comprising a non-transitory computer readable medium retaining program instructions, which instructions when read by a processor, cause the processor to perform: obtaining a test suite comprising a plurality of tests for a Software Under Test (SUT); and selecting a subset of the test suite, wherein the subset provides coverage of the SUT that correlates to a coverage by a workload of the SUT, wherein the workload defines a set of input events to the SUT thereby defining portions of the SUT that are to be invoked during execution.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
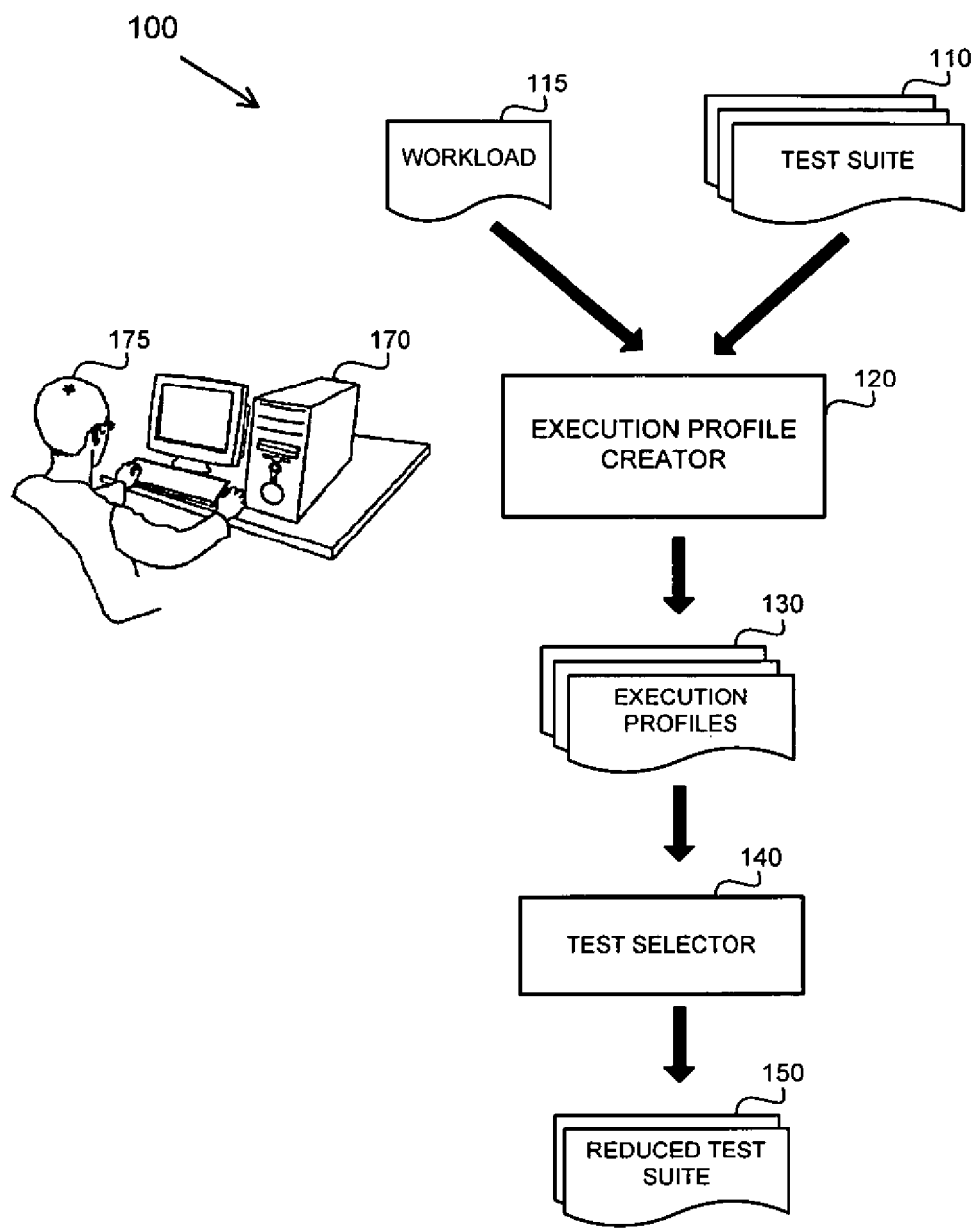
FIG. 1 shows a conceptual illustration of a computerized environment, in accordance with some embodiments of the disclosed subject matter.

The disclosed subject matter is described below with reference to flowchart illustrations and/or block diagrams of methods, apparatus (systems) and computer program products according to embodiments of the subject matter. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the present disclosure a "code" may refer to a software representation of the SUT. The code may be, for example, a binary code of low level instructions, Java byte code, a high level code, or the like.

In the present disclosure a "workload" may refer to business level income transactions, at a certain rate, that are used to execute the SUT. Workload may be predefined valid input the program uses during its execution. For example, a set of business level income transactions, issued at a certain rate during normal execution of the SUT in the client side. Workload may generally represent the load of processing that the SUT is required to perform. In some exemplary embodiments, in case the SUT cannot handle the workload, the SUT is of little value to a customer, if at all. As opposed to existence of bugs in corner cases, which are generally exhibited only in rare circumstances, bugs during the workload will generally inhibit the customer's ability to use the SUT. In some exemplary embodiments, there may be different workloads associated with different operations of the SUT, such as by different clients, different configurations, different use-cases, or the like.

In the present disclosure an "execution profile" depicts behavior of the SUT during execution. Execution profiles may be associated with execution of a workload, execution of a test, or the like. In some exemplary embodiments, an execution profile may be a mapping between program code locations (e.g., the address of each instruction in the code) to a set of events that were measured during execution thereof. The events may be measured by instrumenting the code, by monitoring hardware performance monitors events that are triggered by the processor during execution of the SUT, or the like. In some exemplary embodiments, for each program code location, a counter of each type of monitored event may be provided. Additionally or alternatively, the counters may be normalized and therefore useful for describing distribution of events. In some exemplary embodiments, the events may be, for example, execution of the program code location event, branch taken event with respect to a conditional branch statement, a cache miss event, a lock or unlock event, or the like.

One technical problem dealt with by the disclosed subject matter is to aim testing to correlate with principal workloads of the SUT.

Another technical problem is to select an optimal subset of tests with respect to coverage of a workload given a predetermined budget, such as number of tests in the subset, runtime of the tests, or the like.

One technical solution is to select a subset of tests from a test suite such that the coverage of the subset correlates to the coverage by a workload. In some exemplary embodiments, an execution profile of each test as well as of the workload may be obtained. In some exemplary embodiments, based on similarity measurements between the execution profiles of the tests and of the workload, the subset of tests may be selected.

In some exemplary embodiments, execution profiles are concise description of events of interest that occurred during execution of the SUT with respect to the instruction that was executed when the event occurred. In some exemplary embodiments, hardware performance monitors may be used to monitor events and the value of the program counter (PC) may be examined to determine the program code location associated with the event.

In some exemplary embodiments, based on the execution profiles, it can be determined for each, how its coverage will increase the similarity of the test collection's coverage to the coverage of the workload. It will be noted that the term "coverage" should be construed in this context as the events that are triggered and program code locations that are executed during execution of the SUT. In some exemplary embodiments, aggregated execution profile may be computed to determine similarity between a set of tests and the workload.

In some exemplary embodiments, greedy or non-greedy algorithms may be used to select the subset of a set of existing test base that is considered to be optimal. As an example only, a temporary set, which may be initially an empty set, may be used. It may then be determined out of the possible tests to be introduced to the set, which provides for a maximal contribution to the accumulated coverage to be more similar the workload. That test may be added to the set. This process may be performed iteratively to introduce additional tests. The iterative process may continue until a predetermined constraint, such as accumulated coverage, number of tests, expected run time of the tests, or the like, is satisfied.

One technical effect is enabling to tailor coverage of a test suite to coverage workload of the SUT that may be critical to a customer. In some exemplary embodiments, the test suite determined by the disclosed subject matter may intentionally select a subset of tests that does not provide full coverage of the SUT, such as in case the workload does not utilize all the functionalities of the SUT or invoke all code sections thereof.

It may be a surprising result that the test selection process is directed towards purposely avoiding full coverage of the SUT.

Another technical effect may be to enable testing of the SUT with respect to a desired workload, so as to ensure that the SUT would function properly under normal and expected inputs.

Yet another technical effect may be to automatically determine a set of tests that simulate principal operation of the SUT.

Referring now to FIG. 1, showing a conceptual illustration of a computerized environment, in accordance with some embodiments of the disclosed subject matter. A Computerized Environment 100 may comprise one or more computerized tools.

In some exemplary embodiments, a User 175, such as a developer, a QA staff member, a tester, a designer, a verification engineer or the like, may interact with Computerized Environment 100. User 175 may utilize a Man-Machine Interface (MMI) 170 such as a terminal, a display, a keyboard, an input device or the like to interact with a computer (not shown).

A Test Suite 110 may include a plurality of tests of an SUT. The tests may provide for inputs that trigger functionalities of the SUT. In some exemplary embodiments, each test may be configured to invoke different functionalities and/or test different aspects of the SUT. Test suite 110 may be provided in a computer-readable form, such as in digital files.

A Workload 115 may represent a target workload which is desired to be used as a reference. In some exemplary embodiments, Workload 115 may be provided as a record of inputs to the SUT, such as recordation of inputs that the SUT received in the customer's location. Additionally or alternatively, Workload 115 may be generated based on input provided by User 175 to the SUT when mimicking a desired workload. In some exemplary embodiments, Workload 115 itself may not be obtained but rather execution profile thereof may be created based on execution of the SUT with respect to the target workload.

An Execution Profile Creator 120 may be configured to create Execution Profiles 130 based on an execution of the SUT. An execution profile may be created with respect to an execution of a test of Test Suite 110. Additionally or alternatively, the execution profile may be created with respect to an execution of Workload 115. In some exemplary embodiments, execution profile may be created on-site in a customer location, such as by utilizing Execution Profile Creator 120 to monitor the SUT when the SUT is under the target workload. Additionally or alternatively, the execution profile may be generated off-site.

Execution Profile Creator 120 may utilize non-intrusive hardware performance monitors of a target processor executing the SUT. During execution of the SUT, the hardware performance monitors may provide information relating to events that occurred during execution and their associated instruction location (e.g., value of an instruction pointer, a program counter, or the like). Additionally or alternatively, events may be monitored in an intrusive manner, such as by instrumenting the SUT with monitoring code. Instrumentation may be performed with respect to source code or with respect to a binary of the SUT.

Test Selector 140 may be configured to select a Reduced Test Suite 150 out of the Test Suite 110 in view of Execution Profiles 130.

In some exemplary embodiments, Reduced Test Suite 150 has identical coverage of that of the Test Suite 110 (i.e., covers everything that Test Suite 110 covers). Given Test Suite 110, a representative workload (115) and a code of SUT, a minimal subset of Test Suite 110 may be selected such that it has identical code coverage as Test Suite 110 on one hand, and maximum code relevancy to the workload on the other hand. The motivation of selecting a minimal subset may be due to time saving aspects. In this case there might be several different minimal subsets with identical code coverage as Test Suite 110. Therefore the subject may want to select a minimal subset with the highest code relevancy to a target workload.

In some exemplary embodiments, Reduced Test Suite 150 has partial code coverage but high code relevancy. In some exemplary embodiments, the tests are selected to provide the high relevancy with respect to the workload. However, code coverage of the Reduced Test Suite 150 may be reduced with comparison to Test Suite 110. In some exemplary embodiments, reduction in coverage may be desired due to time constraints. The motivation in this case may be to test at least the code segments that are used the most by Workload 115.

In some exemplary embodiments, in case Workload 115 is not available and instead relevancy may be determined with respect to Test Suite 110. To determine the code relevancy of a test, denoted as t, the code that is covered by test t may be compared with the code that is covered by the tests in Test Suite 110 excluding test t.

In some exemplary embodiments, Test Selector 140 may be configured to calculate a similarity measurement between execution profiles. In some exemplary embodiments, the similarity measurement, which is also referred to as code relevancy, measures similarity between the execution profiles. In some exemplary embodiments, two profiles are said to be similar if they describe similar events occurring with respect to the same program code locations.

In some exemplary embodiments, the similarity measurement may be computed using any algorithm known in the art for measurement of a correlation, such as for example cosine similarity, Pearson's product-moment correlation, or the like. In some exemplary embodiments, similarity measurement may be computed based on normalized execution profiles. It will be noted that normalized execution profiles provide information relating to a distribution of the events with respect to program code locations of the SUT in which the events were invoked. Normalized execution profiles are not affected by a total number of events that occurred but rather on their distribution with respect to the program code locations.

In some exemplary embodiments, a profile execution of Profile Executions 130 may describe events that occurred with respect to instructions of the SUT. Based on the events that are monitored, different similarity measurements may be computed and used by Test Selector 140.

In one example, code relevancy of a test in Test Suite 110 may be based on the similarity between which code portions are executed by the test with respect to Workload 115. Execution Profiles 130 may provide a count of the number of times every instruction during execution. The more the test covers instructions which are executed in high frequency in Workload 115, the more relevant the test may be deemed. Additionally or alternatively, Reduced Test Suite 150 may be aimed towards covering the same set of instructions which are invoked by Workload 115 and at the same frequency.

In another example, code relevancy of a test may refer to the profile of the number of branch instructions, in the coverage of the test, that are taken (close to) 50% of the time during the run of Workload 115. The more the frequent irregular branch instructions, which are in Workload 115, are exhibited also in the execution the test may be deemed more relevant.

In yet another example, code relevancy of a test may refer to the profile of the number of locking or unlocking instructions, which are executed by the SUT when performing the test, that are actively involved with lock/release events during the run of Workload 115.

In yet another example, code relevancy of a test may refer to the profile of the number of cache related events, such as cache miss events, and the instruction of the SUT with which such events are associated. The more that similar cache events occur during execution of the test in the same code locations as they occur during execution of Workload 115, the more that the test may be deemed relevant to Workload.

It will be noted that in some exemplary embodiments the similarity measurement is determined based on execution profiles which are associated with a workload, with a test, or the like. Similarity measurement may also be based on an execution profile which is an aggregation of two or more execution profiles, thereby enabling determination of code relevancy with respect to a set of tests.

Figure 2A:
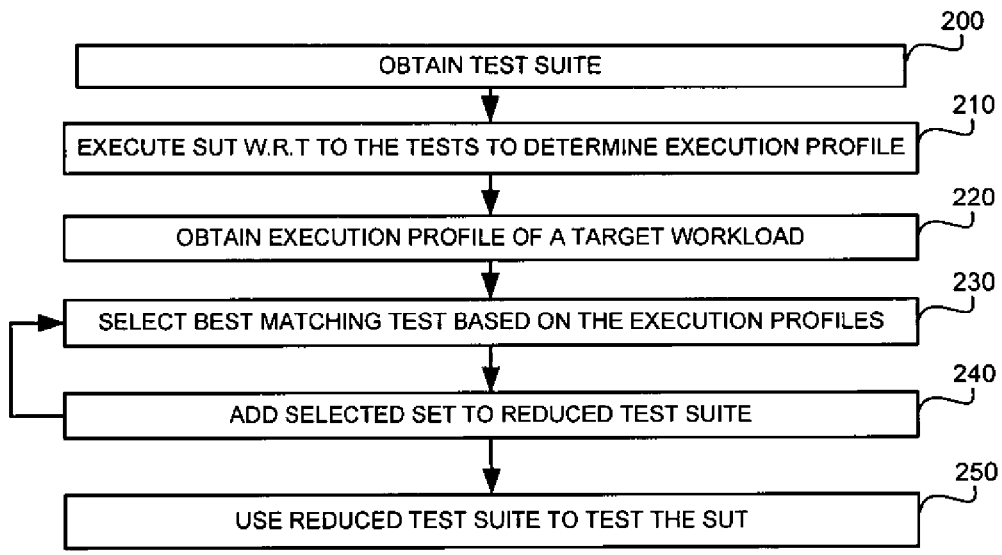
FIG. 2A-2B show flowcharts of methods, in accordance with some embodiments of the disclosed subject matter.

Referring now to FIG. 2A showing a flowchart of a method, in accordance with some embodiments of the disclosed subject matter.

In Step 200, a test suite, such as 110, may be obtained.

In Step 210, the SUT may be executed with respect to each test of the test suite. During execution of the SUT, the execution may be monitored, and an execution profile may be determined. In some exemplary embodiments, Step 210 may be performed by Execution Profile Generator 120.

In Step 220, an execution profile of a target workload, such as Workload 115, may be obtained. In some exemplary embodiments, the execution profile may be obtained based on a monitoring of operation of the SUT when loaded with the target workload, such as on-site.

In Step 230, the tests of the test suite may be compared to the workload based on the execution profiles and a best matching test may be identified. The best matching test may be, for example, the test having the highest code relevancy (e.g., similarity measurement) with respect to the workload. Additionally or alternatively, the best matching test may be the test providing the maximal addition to code relevancy to a pre-existing set of tests with respect to the Workload, as is exemplified in FIG. 2B. Additionally or alternatively, other ranking rules may be provided to determine the best matching test.

In Step 240, the selected test may be added to a reduced set of tests (150).

Steps 230-240 may be performed iteratively until a halting condition may be met, such as the reduced set of tests reaches a limit on its size, an expected runtime of the reduced set of tests reaches a predetermined limit, an aggregated similarity measurement of the set of tests with respect to the workload reaches a predetermined goal, combination thereof, or the like.

Once the halting condition is met, Step 250 may be performed and the reduced set of tests may be used to test the SUT. In some exemplary embodiments, the reduced set of tests may be reused a plurality of times, such as with respect to different configurations of the SUT, with respect to different versions of the SUT, or the like. In some exemplary embodiments, the reduced set may be reused on succeeding versions of the SUT, such as having modified compiled code. In some exemplary embodiments, it may be determined, either manually, automatically or in combination thereof, whether the SUT is modified so as to require recalculating similarity measurements. In such a case the method of FIG. 2A may be performed once more.

Figure 2B:
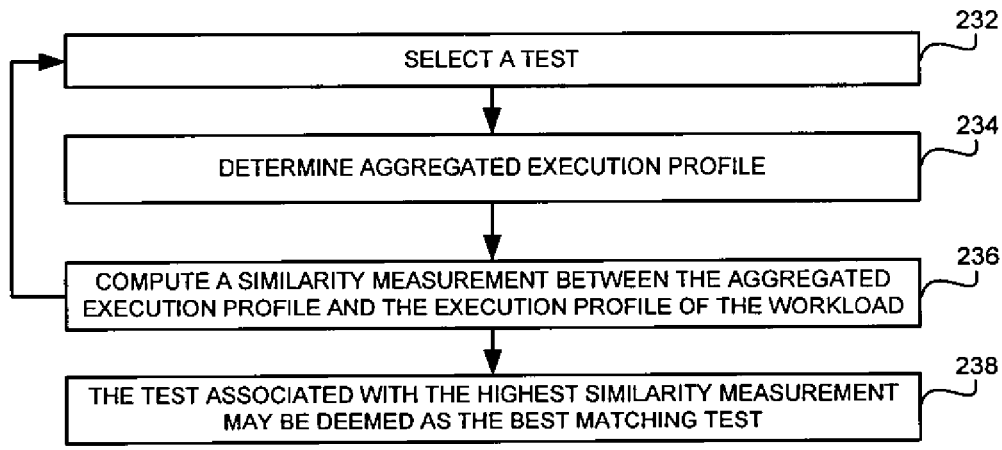

Referring now to FIG. 2B showing a flowchart for a method for determining a best matching test, in accordance with some embodiments of the disclosed subject matter.

In Step 232-236 all tests in a group of tests to be examined, such as for example all tests in Test Suite not yet added to Reduced Test Suite, are examined.

In Step 232, a test to be examined is selected.

In Step 234, an aggregated execution profile is determined. The aggregated execution profile is determined based on the execution profiles of the test and of each test in a set of tests, such as the current Reduced Test Suite. The aggregated execution profile provides an execution profile of all the previously selected tests (i.e., tests in Reduced Test Suite) if the test selected in Step 232 were to be added thereto.

In Step 236, a similarity measurement may be computed between the aggregated execution profile and the execution profile of the workload.

In Step 238, the test associated with the highest similarity measurement may be deemed as the best matching test.

In some exemplary embodiments, the method of FIG. 2B may be implemented by an algorithm in accordance with the following pseudo code. It will be noted that function determineRelevancy may be configured to compute a similarity measurement score in accordance with the disclosed subject matter. The function aggregate may determine an aggregated execution profile based on two or more execution profiles.

```
Algorithm deltaRelevancy(pU, pW, pT) {
    // find the contribution (delta) of test to the relevancy
    // of subset of tests with respect to workload
    // parameters:
    // pU- profile of a set of tests,
    // pW- profile of the workload,
    // pT- profile of a test
        relevancy = determineRelevancy(pW, pU)
        pAggregated = aggregate(pU, pT)
        newRelevancy = determineRelevancy(pW, pAggregated)
        deltaRelevancy = newRelevancy - relevancy
        return deltaRelevancy
}
Algorithm greedySelect(T, pW, p, H) {
    // parameters:
    // T- set of tests
    // pW - profile of Workload
    // p - execution profiles of the tests
    // H- halting condition (function over a set of tests)
    //
    V = T      // remaining, not-yet selected tests
    U = empty set //U is reduced test suite. Initially empty
    pU = empty profile
    while not H(U) {         //is the halting condition met by U
        for all v in V {
            obtain pV from p of test v
            dr=deltaRelevancy(pU, pW, pV)
        }
        select u as v having highest dr value.
        U = U + {u}        // add u to Reduced Test Suite
        V = V - {u}
        obtain profile pV from p of test u
        pU = aggregate(pU, pV) //update execution profile of U
    }
    return U
}
```

In some exemplary embodiments, instead of computing the delta relevancy, the relevancy of the aggregated execution profiles may be computed without subtracting the relevancy of the aggregated execution profile excluding the selected test.

Figure 3:
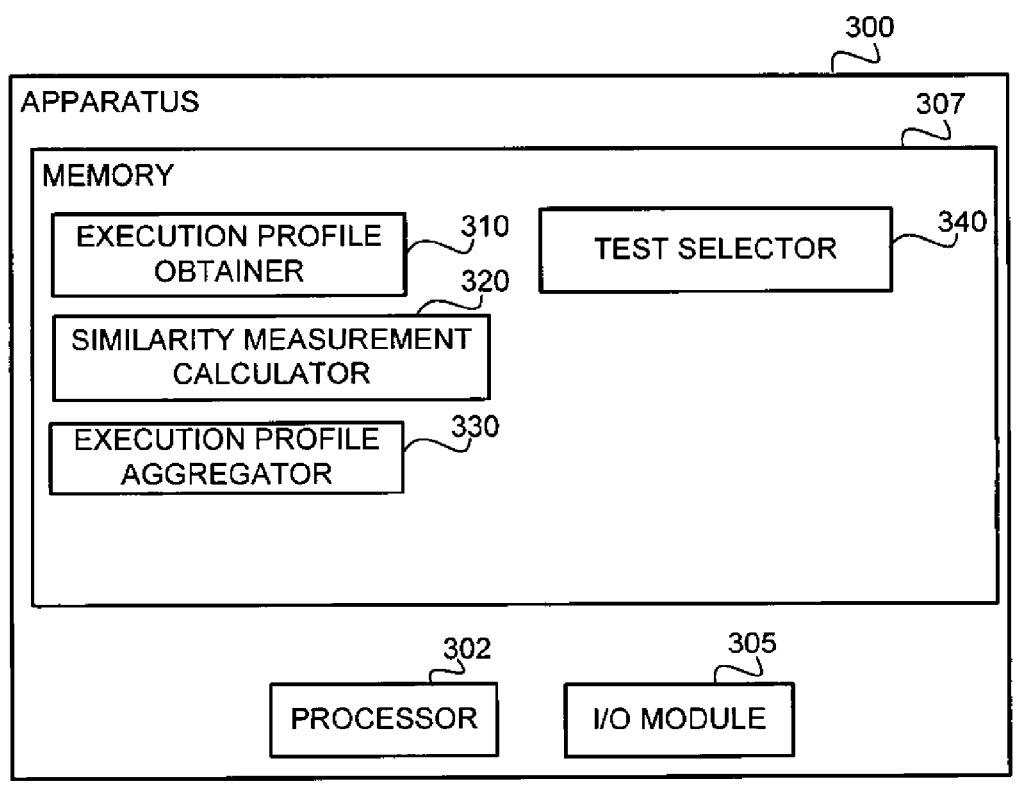
FIG. 3 shows a block diagram of components of an apparatus, in accordance with some exemplary embodiments of the disclosed subject matter.

Referring now to FIG. 3 showing a block diagram of components of an apparatus, in accordance with some exemplary embodiments of the disclosed subject matter.

An Apparatus 300, such as performing steps of methods depicted in FIG. 2A-2B, may be configured to select a reduced test suite out of a test suite, in accordance with the disclosed subject matter.

In some exemplary embodiments, an Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents. Processor 302 may be configured to execute computer-programs useful in performing the method of FIGS. 2A-2B.

In some exemplary embodiments of the disclosed subject matter, Apparatus 300 may comprise an Input/Output (I/O) Module 305. I/O Module 305 may be utilized to provide an output to and receive input from a user. However, it will be understood the Apparatus 300 may be utilized without user intervention. In some exemplary embodiments, I/O Module 305 may be utilized to obtain, such as from a digital source, from a user, or the like, Test Suite 110, Execution Profiles 130, Workload 115, or the like. In some exemplary embodiments, I/O Module 305 may be used to output Reduced Test Suite 150, such as in a form of a computer-readable medium, to other tools, such as in order to be used for test the SUT.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps shown in FIG. 2A-2B above. Memory Unit 307 may be used to retain execution profiles, tests, or the like.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

Execution Profile Obtainer 310 may be configured to obtain an execution profile of a test and of a workload. The execution profile may be obtained from an external source, or may be generated by Execution Profile Obtainer 310, such as by executing a desired test on the SUT and by monitoring the execution thereof.

Similarity Measurement Calculator 320 may be configured to compute a similarity measurement between two execution profiles. Each execution profile may be an execution profile of a test, an aggregated execution profile of a set of tests, an execution profile of a workload, or the like. In some exemplary embodiments, Similarity Measurement Calculator 320 may normalize the execution profiles and compare the normalized execution profiles.

Execution Profile Aggregator 330 may be configured to aggregate two or more execution profiles to a single execution profile, such as by aggregating the events associated with the same program code location in all execution profiles.

Test Selector 340 may be configured to select a reduced test suite based on the similarity measurements computed by Similarity Measurement Calculator 320.

Figure 4:
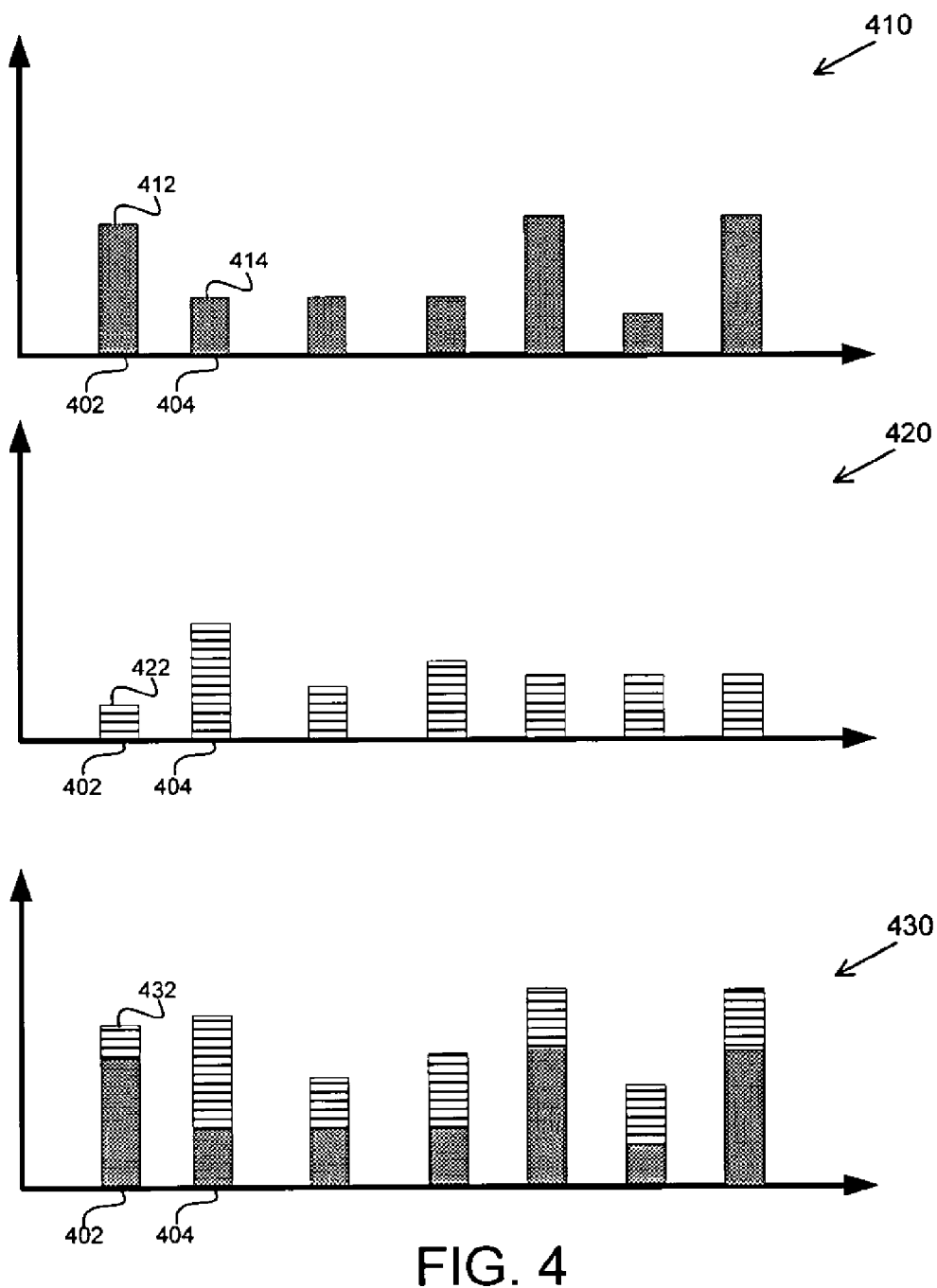
FIG. 4 shows a conceptual illustration of execution profiles, in accordance with some embodiments of the disclosed subject matter.

Referring now to FIG. 4 showing a conceptual illustration of execution profiles, in accordance with some embodiments of the disclosed subject matter.

A First Execution Profile 410 is illustrated as a chart providing information regarding a number of events associated with a program code location. For example, in program code location 402, the number of monitored events is depicted by rectangle 412. In a different program code location 404, the rectangle 414 illustrates that a smaller number of events were identified. It will be noted that although FIG. 4 is limited to a single type of event being monitored, the disclosed subject matter is not limited to such embodiments and there may a variety of events being monitored and counted with respect to each program code location.

A Second Execution Profile 420 is illustrated in the same manner, where rectangles are used to depict a number of events monitored in each program code location of the SUT.

An Aggregated Execution Profile 430 aggregating both First Execution Profile 410 and Second Execution Profile 420. With respect to each program code location, the number of monitored events in the aggregated execution profile may be a summation of the events in both execution profiles. For example, in program code location 402, rectangle 432 is a summation of rectangles 412 and 422.

In some exemplary embodiments, the first and second execution profiles 410, 420 may or may not be normalized prior to aggregation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, the method performed by a processor, the method comprising:
obtaining a test suite comprising a plurality of tests for a Software Under Test (SUT);
selecting a subset of the test suite, wherein the subset provides coverage of the SUT that correlates to a coverage by a workload of the SUT, wherein the workload defines a set of input events to the SUT thereby defining portions of the SUT that are to be invoked during execution;
determining an execution profile of the workload;
obtaining execution profiles of each test of the test suite; and
wherein said selecting comprises:
determining a similarity measurement between substantially each test and the workload based on the execution profiles thereof;
selecting the subset of the test suite based on the similarity measurements; and
wherein said selecting comprises selecting the subset that is associated with a most similar aggregated similarity measurement to that of the workload, wherein an aggregated similarity measurement measures similarity between a set of tests and the workload based on an aggregated execution profile of the set of test and the execution profile of the workload.

2. The computer-implemented method of claim 1, wherein said selecting the subset based on the similarity measurement comprises selecting most similar tests to the workload based on the similarity measurement.

3. The computer-implemented method of claim 1, wherein the execution profile is a mapping between program code locations in the SUT and counters of events measured during execution of the program code locations.

4. The computer-implemented method of claim 3, wherein the counters are normalized, thereby the execution profile provides information relating to a distribution of events with respect to program code locations.

5. The computer-implemented method of claim 3, wherein the measured events are selected from a group consisting of:
an execution of the program code;
a branch taken event with respect to a conditional branch statement;
a cache miss event; and
a lock or unlock event.

6. The computer-implemented method of claim 1, wherein said determining the execution profile of the workload comprises: executing the SUT with respect to the workload and measuring using hardware performance monitors events triggered by the processor during execution of the SUT.

7. A computer-implemented method, the method performed by a processor, the method comprising:
obtaining a test suite comprising a plurality of tests for a Software Under Test (SUT); selecting a subset of the test suite, wherein the subset provides coverage of the SUT that correlates to a coverage by a workload of the SUT, wherein the workload defines a set of input events to the SUT thereby defining portions of the SUT that are to be invoked during execution;
determining an execution profile of the workload;
obtaining execution profiles of each test of the test suite;
wherein said selecting comprises:
determining a similarity measurement between substantially each test and the workload based on the execution profiles thereof; and
selecting the subset of the test suite based on the similarity measurements: and
wherein said selecting comprises:
having a set of tests, wherein the set is initially empty;
performing repeatedly:
determining which of the tests in the test suite that is not comprised by the set, if added to the set, would induce a highest similarity measurement between an aggregated execution profile of the set and the execution profile of the workload; and
adding the determined test.

8. The computer-implemented method of claim 7, wherein said performing repeatedly is performed until a stop condition is met, wherein the stop condition met in case the similarity measurement is above a predetermined level or in case a size of the set reaches a predetermined threshold.

9. The computer-implemented method of claim 7, wherein the execution profile is a mapping between program code locations in the SUT and counters of events measured during execution of the program code locations.

10. The computer-implemented method of claim 9, wherein the counters are normalized, thereby the execution profile provides information relating to a distribution of events with respect to program code locations.

11. The computer-implemented method of claim 9, wherein the measured events are selected from a group consisting of:
an execution of the program code;
a branch taken event with respect to a conditional branch statement;
a cache miss event; and
a lock or unlock event.

12. The computer-implemented method of claim 7, wherein said determining the execution profile of the workload comprises: executing the SUT with respect to the workload and measuring using hardware performance monitors events triggered by the processor during execution of the SUT.

13. A computerized apparatus having a processor and a memory, the processor being adapted to perform the steps of:
obtaining a test suite comprising a plurality of tests for a Software Under Test (SUT);
selecting a subset of the test suite, wherein the subset provides coverage of the SUT that correlates to a coverage by a workload of the SUT, wherein the workload defines a set of input events to the SUT thereby defining portions of the SUT that are to be invoked during execution;
determining an execution profile of the workload;
obtaining execution profiles of each test of the test suite; and
wherein said selecting comprises:
determining a similarity measurement between substantially each test and the workload based on the execution profiles thereof; and
selecting the subset of the test suite based on the similarity measurements;
wherein said selecting comprises selecting the subset that is associated with a most similar aggregated similarity measurement to that of the workload, wherein an aggregated similarity measurement measures similarity between a set of tests and the workload based on an aggregated execution profile of the set of test and the execution profile of the workload.

14. The apparatus of claim 13, wherein said selecting the subset based on the similarity measurement comprises selecting most similar tests to the workload based on the similarity measurement.

15. The apparatus of claim 13, wherein the execution profile is a mapping between program code locations in the SUT and counters of events measured during execution of the program code locations.

16. The apparatus of claim 13, wherein said determining the execution profile of the workload comprises: executing the SUT with respect to the workload and measuring using hardware performance monitors events triggered by the processor during execution of the SUT.

17. The apparatus of claim 13, wherein said selecting comprises:
  having a set of tests, wherein the set is initially empty;
  performing repeatedly:
    determining which of the tests in the test suite that is not comprised by the set, if added to the set, would induce a highest similarity measurement between an aggregated execution profile of the set and the execution profile of the workload; and
    adding the determined test.

18. The apparatus of claim 17, wherein said performing repeatedly is performed until a stop condition is met, wherein the stop condition met in case the similarity measurement is above a predetermined level or in case a size of the set reaches a predetermined threshold.

* * * * *